(12) United States Patent
Tabata et al.

(10) Patent No.: US 8,007,402 B2
(45) Date of Patent: Aug. 30, 2011

(54) CONTROL APPARATUS FOR HYBRID VEHICLE DRIVE SYSTEM

(75) Inventors: Atsushi Tabata, Okazaki (JP); Tooru Matsubara, Toyota (JP); Hiroyuki Shibata, Toyota (JP); Kenta Kumazaki, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 688 days.

(21) Appl. No.: 12/081,476

(22) Filed: Apr. 16, 2008

(65) Prior Publication Data
US 2008/0261770 A1    Oct. 23, 2008

(30) Foreign Application Priority Data
Apr. 20, 2007    (JP) ................................ 2007-112320

(51) Int. Cl.
*B60K 1/02*    (2006.01)
(52) U.S. Cl. .......................................................... 477/3
(58) Field of Classification Search ...................... 477/3
See application file for complete search history.

(56) References Cited

U.S. PATENT DOCUMENTS 7,771,309 B2 * 8/2010 Kamada et al. ................... 477/3
2004/0152558 A1 * 8/2004 Takami et al. ..................... 477/3

FOREIGN PATENT DOCUMENTS

| JP | A 2004-208417 | 7/2004 |
| JP | A 2004-225573 | 8/2004 |
| JP | A 2006-213149 | 8/2006 |
| WO | WO 2006093356 A1 * | 9/2006 |

* cited by examiner

*Primary Examiner* — David D Le
*Assistant Examiner* — Erin D Bishop
(74) *Attorney, Agent, or Firm* — Oliff & Berridge, PLC

(57) ABSTRACT

A control apparatus for a drive system of a hybrid vehicle including (a) an engine, (b) an electrically controlled differential portion which has a first electric motor, and a differential mechanism operatively connected to the engine and the first electric motor and a differential state of which is controlled by controlling an operating state of the first electric motor, (c) a mechanical transmission portion constituting a part of a power transmitting path, and (d) a second electric motor connected to a power transmitting path between the electrically controlled differential portion and a drive wheel of the hybrid vehicle, the control apparatus including a control portion which is operable when a terminal portion of a shifting action of the mechanical transmission portion and a starting operation of the engine overlap each other, the control portion being configured to implement one of the shifting action and the starting operation prior to the other.

3 Claims, 11 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | | | | | | | | | |

○ ENGAGED
◎ ENGAGED FOR STEP-VARIABLE SHIFTING, AND RELEASED FOR CONTINUOUSLY-VARIABLE SHIFTING

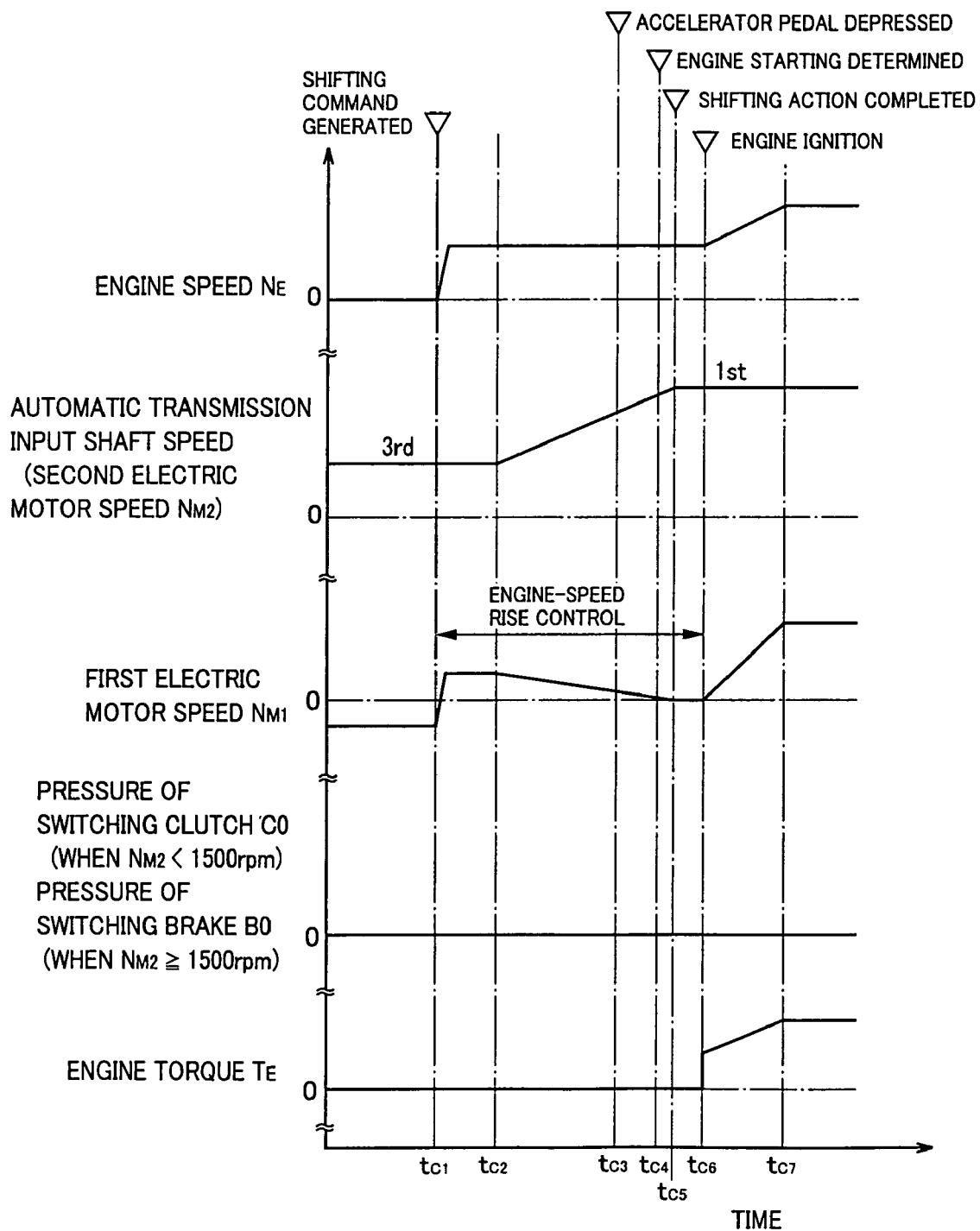

CONTROL APPARATUS FOR HYBRID VEHICLE DRIVE SYSTEM

The present application claims priority from Japanese Patent Application No. 2007-112320 filed on Apr. 20, 2007, the disclosure of which is herein incorporated by reference in its entirety.

BACKGROUND OF THE INVENTION

1. Field of the Invention

The present invention relates in general to a control apparatus for a vehicular drive system, and more particularly to a control apparatus for a hybrid vehicle drive system including an internal combustion engine and an electric motor as vehicle drive power sources, which control apparatus is arranged to reduce a shock generated upon starting of the engine when a vehicle drive mode is changed from a motor drive mode to an engine drive mode.

2. Discussion of Prior Art

In a hybrid vehicle drive system as described above, an engine-starting shock may be generated upon starting of the engine when the vehicle drive mode is changed from the motor drive mode using the electric motor as the vehicle drive power source, to the engine drive mode using the engine as the vehicle drive power source. Further, a shifting shock may be generated upon an engaging action of a coupling device of an automatic transmission which takes place to perform a shifting action. If the engine-staring shock and the shifting shock overlap each other, the vehicle operator feels a large amount of shock due to the overlap, which deteriorates a vehicle driving comfort as felt by the vehicle operator.

JP-2006-213149A discloses an example of a control apparatus for a hybrid vehicle drive system, which is arranged to solve the above-indicated problem encountered upon changing of the vehicle drive mode from the motor drive mode to the engine drive mode. In the hybrid vehicle drive system disclosed in the above-identified publication, a continuously-variable transmission portion including a first electric motor, a second electric motor and a differential mechanism and operable as an electrically controlled continuously variable transmission is disposed between the engine and an output shaft of the drive system. The continuously-variable transmission portion is provided with coupling devices which are selectively engaged and released to switch the continuously-variable transmission portion between a continuously-variable shifting state in which its speed ratio is continuously variable, and a step-variable shifting state in which the speed ratio is variable in steps. The hybrid vehicle drive system control apparatus disclosed in the publication is arranged, in view of a shifting shock of the continuously-variable transmission portion similar to the shifting shock of the automatic transmission described above, such that a selected one of an operation to switch the shifting state of the continuously-variable transmission portion and an operation to start the engine is implemented prior to the other if the switching operation of the shifting state and the starting operation of the engine would otherwise overlap each other.

The control apparatus disclosed in the above-identified publication which prevents overlapping of the engine-starting shock and the shifting shock of the continuously-variable transmission portion, and therefore prevents a large shock due to the overlap, as felt by the vehicle operator. However, the control apparatus suffers from some problems arising from its control arrangement to implement one of the switching operation of the shifting state of the continuously-variable transmission portion and the starting operation of the engine, prior to the other operation if these two operations would otherwise overlap each other. If the switching operation of the shifting state is implemented prior to the engine starting operation, for example, the engine speed is raised and started only after completion of the switching operation of the shifting state of the continuously-variable transmission portion which takes a relatively long time. In this case, therefore, a rise of the vehicle drive torque generated by the drive system is delayed with respect to a moment of rise of the drive torque expected by the vehicle operator. If the engine starting operation is implemented prior to the switching operation of the shifting state, on the other hand, the shifting state of the continuously-variable transmission portion is switched from the continuously-variable shifting state to the step-variable shifting state or vice versa, only after the engine speed is first raised and then the engine is started. In this case, therefore, the switching operation is delayed with respect to a moment of an operation of the vehicle operator to switch the shifting state of the continuously-variable transmission portion, and the rise of the vehicle drive torque generated by the drive system tends to be delayed.

SUMMARY OF THE INVENTION

The present invention was made in view of the background art described above. It is therefore an object of this invention to provide a control apparatus for a hybrid vehicle drive system including an engine and an electric motor as vehicle drive power sources, which control apparatus permits effective reduction of a shock as felt by a vehicle operator upon switching of the vehicle drive mode from the motor drive mode to the engine drive mode, and substantial elimination of a delay of a rise of a vehicle drive torque as felt by the vehicle operator The object indicated above can be achieved according to the principle of this invention, which provides a control apparatus for a drive system of a hybrid vehicle including (a) an engine, (b) an electrically controlled differential portion which has a first electric motor, and a differential mechanism operatively connected to the engine and the first electric motor and a differential state of which is controlled by controlling an operating state of the first electric motor, (c) a mechanical transmission portion constituting a part of a power transmitting path, and (d) a second electric motor connected to a power transmitting path between the electrically controlled differential portion and a drive wheel of the hybrid vehicle, the control apparatus comprising a control portion operable when a terminal portion of a shifting action of the mechanical transmission portion and a starting operation of the engine overlap each other, the control portion being configured to implement one of the shifting action and the starting operation prior to the other.

The control apparatus constructed according to the principle of the present invention is configured to determine whether the terminal portion of a shifting action of the mechanical transmission portion and the starting operation of the engine overlap each other, and to implement one of the shifting action of the mechanical transmission portion and the starting operation of the engine prior to the other, when the terminal portion of the shifting action and the engine starting operation overlap each other, so that it is possible to prevent overlapping of a starting shock of the engine and a shifting shock of the mechanical transmission portion, whereby the vehicle operator would not feel a large degree of shock even if a command to start the engine and a command to perform the shifting action of the mechanical transmission portion are generated at points of time that are relatively close to each other.

The present control apparatus is further configured such that where the terminal portion of the shifting action and the engine starting do not overlap each other, the engine can be started immediately after the moment of generation of the engine starting command, if the engine starting command is generated during a rise of an operating speed of the engine after a moment of generation of the shifting command and before a moment of completion of the shifting action. Accordingly, the vehicle operator will not feel a delayed moment of completion of the shifting action and a delayed rise of a vehicle drive torque.

According to one preferred form of this invention, the control apparatus further comprises an engine-speed-rise control portion configured to implement an engine-speed rise control for raising an operating speed of the engine to a value not lower than a predetermined engine starting speed, when a command to perform the shifting action of the mechanical transmission portion is generated.

In the above-described preferred form of the invention, upon generation of the command to shift the mechanical transmission portion, the engine-speed rise control is implemented so that the engine can be started immediately if an accelerator pedal of the hybrid vehicle is depressed during the shifting action, whereby the vehicle drive torque can be rapidly increased, with a high response to an operation of the accelerator pedal by the vehicle operator. The engine can be started at the predetermined engine starting speed.

According to one advantageous arrangement of the above-described preferred form of the invention, the engine-speed-rise control portion determines, on the basis of the operating speed of the second electric motor, the operating speed of the first electric motor or de-energization of the first electric motor.

When the engine is started upon switching of the vehicle drive mode from a motor drive mode to an engine drive mode, the operating speed of the engine should be raised by utilizing the second electric motor, to the value not lower than the predetermined engine starting speed can be started. Where the engine is started without energizing the first electric motor, therefore, the operating speed of the second electric motor should be equal to or higher a value corresponding to the predetermined engine starting speed. In the above-described advantageous arrangement, the engine-speed-rise control portion determines whether the first electric motor is energized or not, on the basis of the operating speed of the second electric motor. The first electric motor is not energized where the raised operating speed of the second electric motor is transmitted to the engine, for example, so that energy consumption of the first electric motor is saved. It is also noted that the electrically controlled differential portion provided in the hybrid vehicle drive system is capable of transmitting to the engine the operating speed of the second electric motor that has been raised according to the operating speed of the first electric motor, for implementing the engine-speed rise control. Since the engine-speed-rise control portion determines the operating speed of the first electric motor on the basis of the operating speed of the second electric motor, the operating speed of the second electric motor lower than the speed corresponding to the predetermined engine starting speed can be raised by an output of the first electric motor and the above-described electrically controlled differential portion, and the raised operating speed of the second electric motor is transmitted to the engine, so that the engine can be started irrespective of the operating speed of the second electric motor.

Preferably, the differential mechanism includes a coupling device operable to transmit a drive force from the second electric motor to the engine, and the engine-speed-rise control portion is configured to raise the operating speed of the engine by engaging the engaging device and operating the second electric motor. In this case, the operating speed of the second electric motor can be lowered where the engine speed can be raised to the value not lower than the predetermined engine starting speed even when the operating speed of the second electric motor is lowered. Accordingly, the durability of the differential mechanism is improved.

BRIEF DESCRIPTION OF THE DRAWINGS

The above and other objects, features, advantages and technical and industrial significance of this invention will be better understood by reading the following detailed description of a preferred embodiment of the invention, when considered in connection with the following drawings, in which:

FIG. 13 is a time chart for explaining the control operation of the flow chart of FIG. 10, when an affirmative determination is obtained in step SA6 of FIG. 10 as a result of the shift-down action of the automatic transmission portion from the third gear position to the first gear position in the motor drive mode and a rise of the operating speed of the engine driven by the first electric motor.

DETAILED DESCRIPTION OF PREFERRED EMBODIMENT

Figures 1, 2:
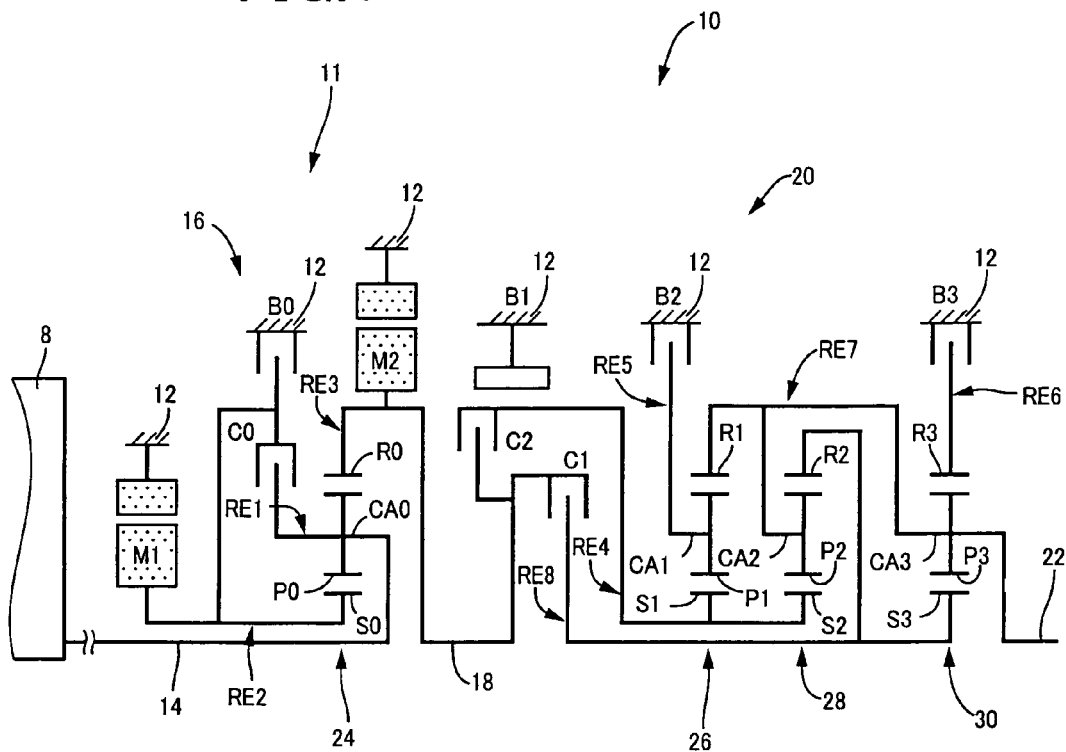
FIG. 1 is a schematic view showing an arrangement of a drive system of a hybrid vehicle to which a control apparatus according to the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
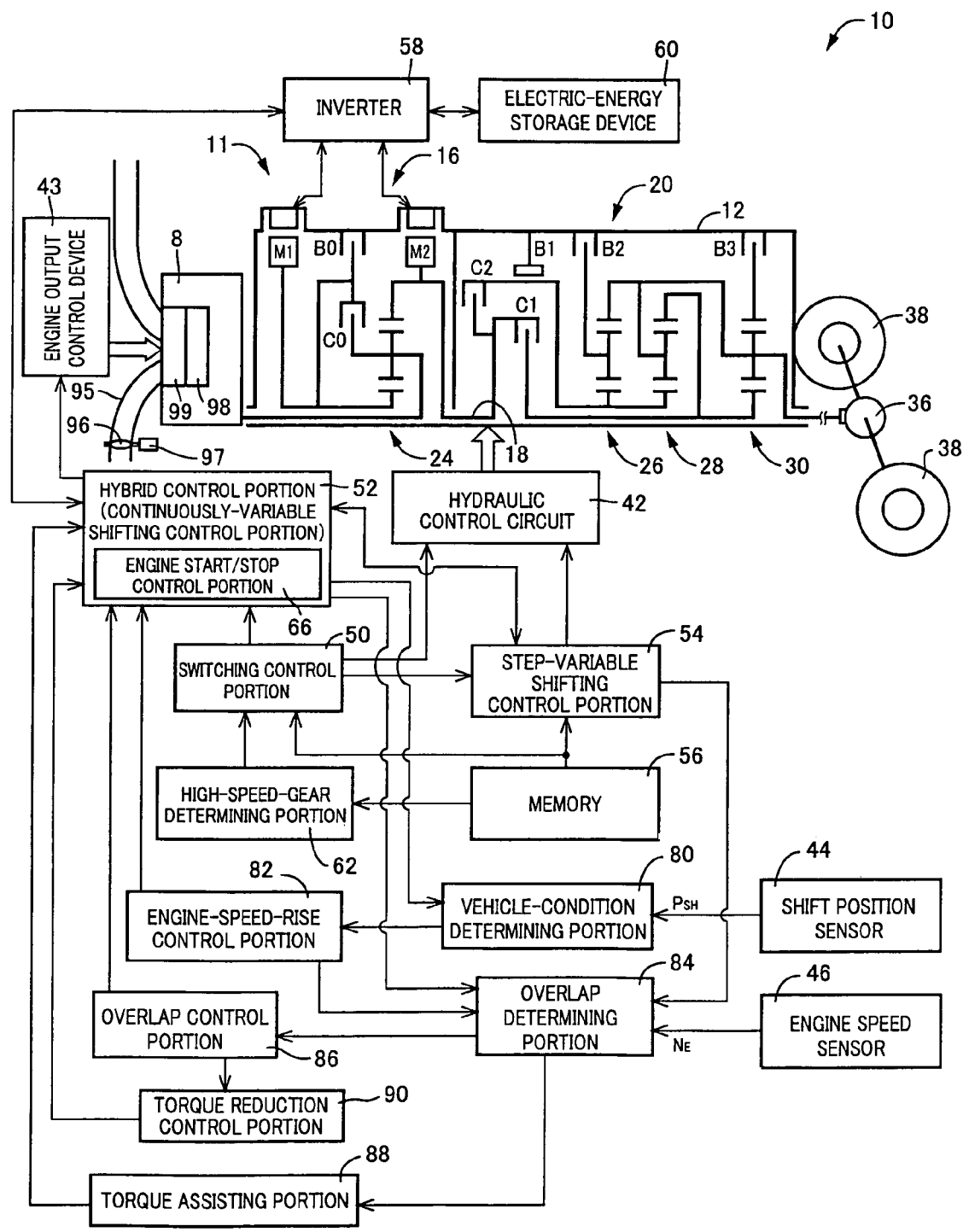
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 may be referred to as an electrically controlled differential portion, in a sense that the differential state of the differential portion 11 is changed by utilizing a first electric motor M1 (which will be described). This differential portion 11 provided with the first electric motor M1 is further provided with; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a planetary gear set 24 of a single pinion type having a gear ratio $\rho 0$ of about 0.418, for example, a switching clutch C0 and a switching brake B1. The planetary gear set 24 of the power distributing mechanism 16 has rotary elements consisting of: a sun gear S0, a planetary gear P0; a first carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio $\rho 0$ is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the switching clutch C0 is disposed between the sun gear S0 and the carrier CA0. When the switching clutch C0 and brake B0 are both released, the power distributing mechanism 16 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the sun gear S0 and the carrier CA0 are connected together, so that the power distributing mechanism 16 is placed in the locked state in which the three rotary elements of the planetary gear set 24 consisting of the first sun gear S1, first carrier CA0 and ring gear R0 are rotatable as a unit, namely, placed in a first non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1. When the switching brake B0 is engaged in place of the switching clutch C0, the sun gear S0 is fixed to the casing 12, so that the power distributing mechanism 16 is placed in the locked state in which the sun gear S0 is not rotatable, namely, placed in a second non-differential state in which the differential function is not available, so that the differential portion 11 is also placed in the non-differential state. Since the rotating speed of the first ring gear R1 is made higher than that of the carrier CA0, the differential portion 11 is placed in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The automatic transmission portion 20 may be referred to as a mechanical transmission portion, in a sense that the automatic transmission portion 20 is mechanically shifted. This automatic transmission portion 20 includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, firs ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios ρ1, ρ2 and ρ3 are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is placed in a selected one of a first gear position (first speed position) through a fifth gear position (fifth speed position), a reverse gear position (rear drive position) and a neural position, by engaging actions of a corresponding combination of the two frictional coupling devices selected from the above-described switching clutch C0, first clutch C1, second clutch C2, switching brake B0, first brake B1, second brake B2 and third brake B3, as indicated in the table of FIG. 2. The above-indicated positions have respective speed ratios γT (input shaft speed $N_{IN}$/output shaft speed $N_{OUT}$) which change as geometric series. The power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing all of the clutches C0, C1, C2 and brakes B0, B1, B2, B2, or by engaging only the switching clutch C0.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position M, namely, the rotating speed of the power transmitting member 18 is continuously changed, so that the speed ratio of the drive system when the automatic transmission portion 20 is placed in the selected gear position M is continuously variable over a predetermined range. Accordingly, the overall speed ratio γT of the transmission mechanism 10 determined by the speed ratio γ0 of the differential portion 11 and the speed ratio γ of the automatic transmission portion 20 is continuously variable.

Figure 3:
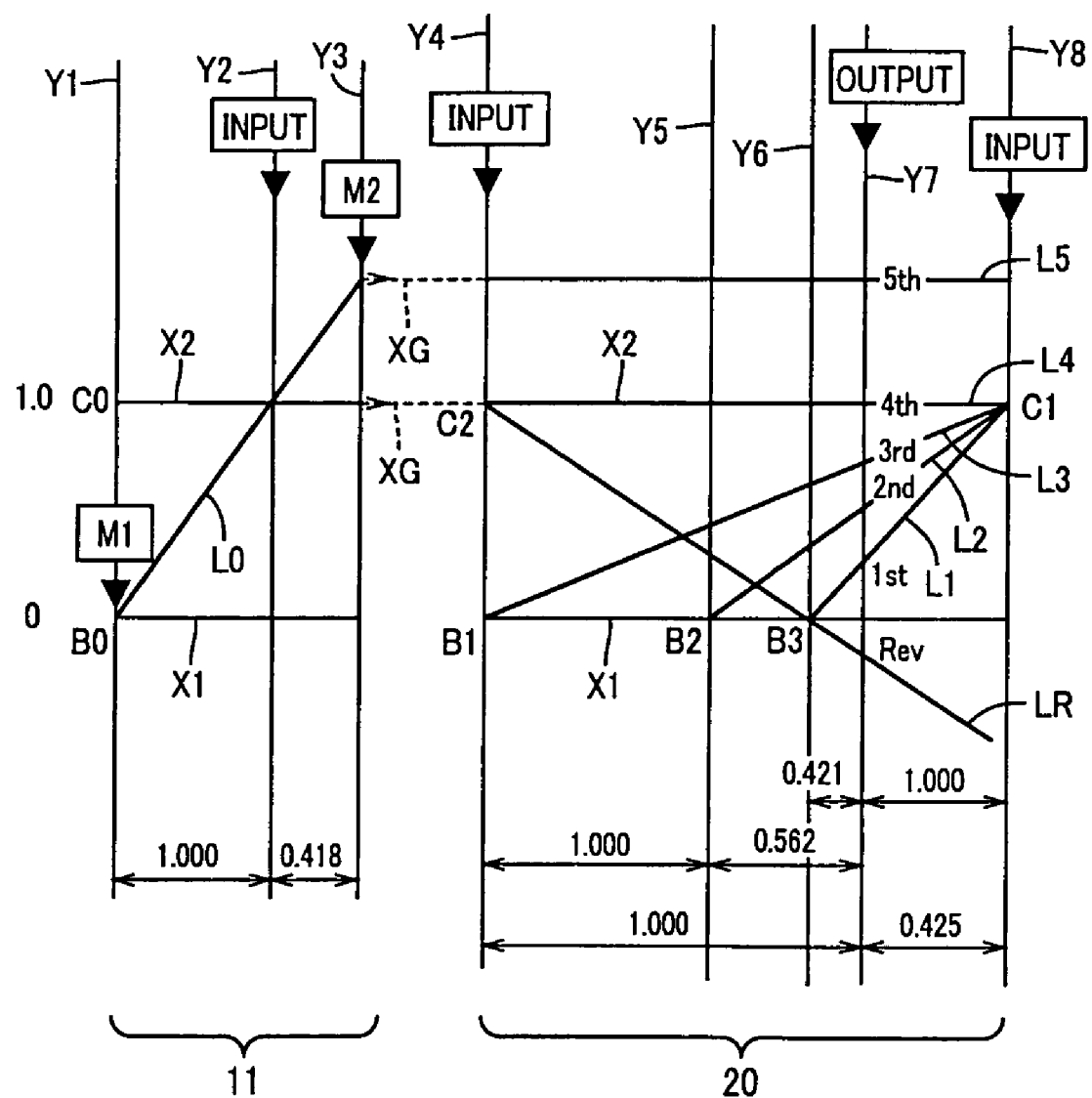
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the sun gear S0 represented by a point of intersection between the straight line L0 and the vertical line Y1 is raised or lowered by controlling the operating speed of the first electric motor M1, so that the rotating speed of the carrier CA0 represented by the straight line L0 and the vertical line Y2 is raised or lowered, if the rotating speed of the ring gear R0 determined by the vehicle speed V and represented by a point of intersection between the straight line L0 and the vertical line Y3 is substantially held constant. When the switching clutch C0 is engaged, the sun gear S0 and the carrier CA0 are connected to each other, and the power distributing mechanism 16 is placed in the first non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the switching brake B0 is engaged, on the other hand, the sun gear S0 is fixed to the casing 12, and the power distributing mechanism 16 is placed in the second non-differential state in which the power distributing mechanism 16 functions as a speed-increasing mechanism, so that the straight line L0 is inclined in the state indicated in FIG. 3, whereby the rotating speed of the ring gear R0 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
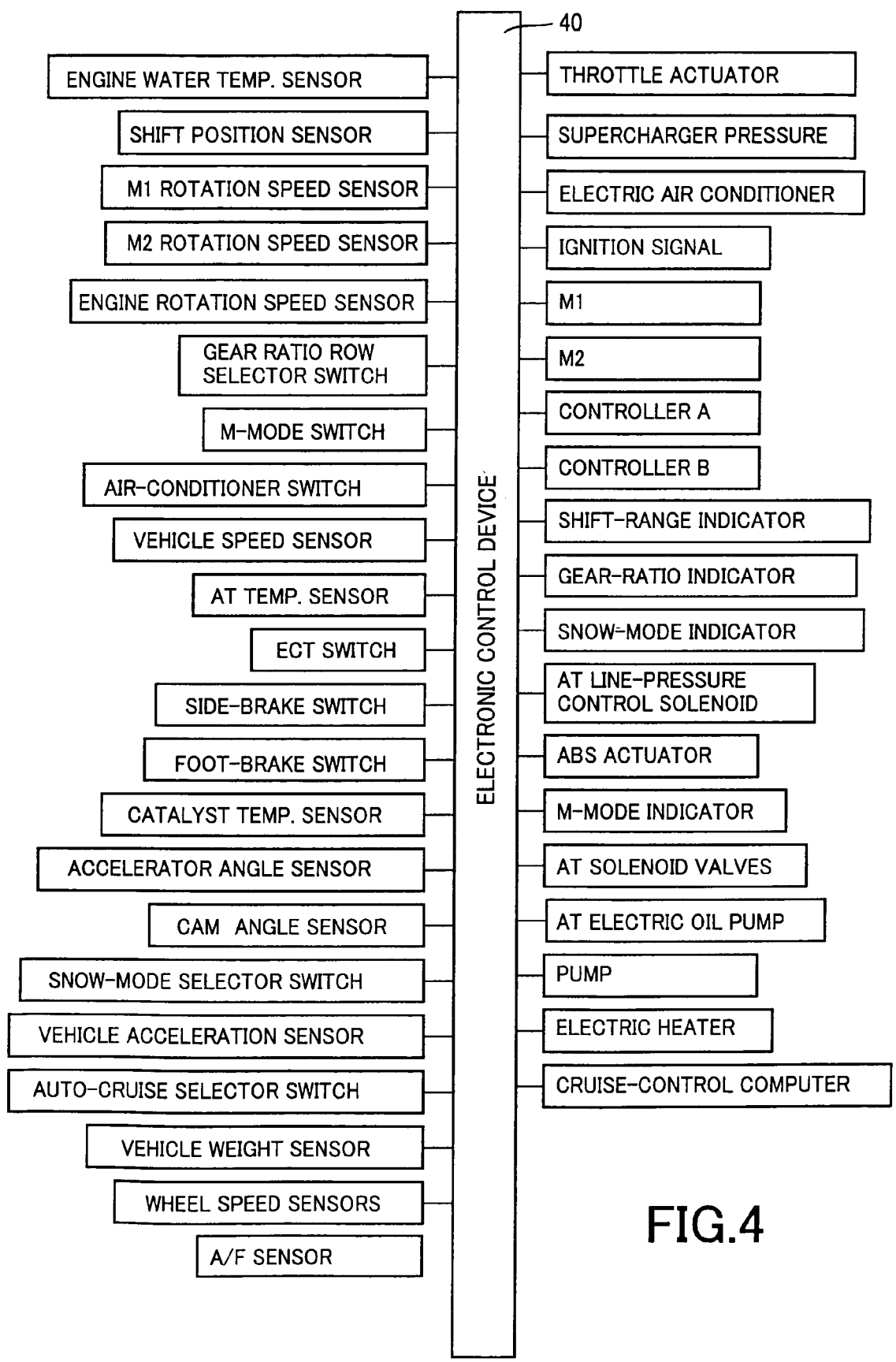
FIG. 4 is a view indicating input and output signals of a control apparatus in the form of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever detected by a shift position sensor 44 (shown in FIG. 5); a signal indicative of an operating speed $N_{M1}$ of the first electric motor M1 (hereinafter referred to as "first electric motor speed $N_{M1}$"); a signal indicative of an operating speed $N_{M2}$ of the second electric motor M2 (hereinafter referred to as "second electric motor speed $N_{M2}$"); a signal indicative of the operating speed $N_E$ of the engine 8 detected by an engine speed sensor 46 (shown in FIG. 5); a signal indicative of a value indicating gear ratios of a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; and a signal indicative of an air/fuel (A/F) ratio of an air-fuel mixture of the engine 8.

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in an intake pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40, which includes a switching control portion 50, a hybrid control portion 52 (a continuously-variable shifting control portion), a step-variable shifting control portion 54, a memory 56, a high-speed-gear determining portion 62, a vehicle-condition determining portion 80, an engine-speed-rise control portion 82, an overlap determining portion 84, an overlap control portion 86, a torque assisting portion 88 and a torque reduction control portion 90. The step-variable shifting control portion 54 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in the memory 56 and which represents shift-up boundary lines indicated by solid lines in FIG. 5 and shift-down boundary lines indicated by one-dot chain lines in FIG. 5. The step-variable shifting control portion 54 generates commands (shifting commands or hydraulic control command) to be applied to the hydraulic control unit 42, to selectively engage and release the respectively two hydraulically operated frictional coupling devices (except the switching clutch C0 and brake B0), for establishing the determined gear position of the automatic transmission portion 20 according to the table of FIG. 2. Described in detail, the step-variable shifting control portion 54 commands the hydraulic control unit 42 to control the solenoid-operated valves incorporated in the hydraulic control unit 42, for activating the appropriate hydraulic actuators to concurrently engage one of the two frictional coupling device and release the other frictional coupling device, to effect the clutch-to-clutch shifting actions of the automatic transmission portion 20.

The hybrid control portion 52 functions as the continuously-variable shifting control portion and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1.

The hybrid control portion 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and for efficient operation of the engine 8, and the rotating speed of the power transmitting member 18 determined by the vehicle speed V and the selected gear position of the transmission portion 20. That is, the hybrid control portion 52 determines a target value of the overall speed ratio γT of the transmission mechanism 10, so that the engine 8 is operated according to a stored highest-fuel-economy curve (fuel-economy map or relation) stored in memory means. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control portion 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control portion 52 is basically arranged to control the throttle actuator 97 on the basis of the operating amount $A_{CC}$ of the accelerator pedal 45 (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$.

Figure 6:
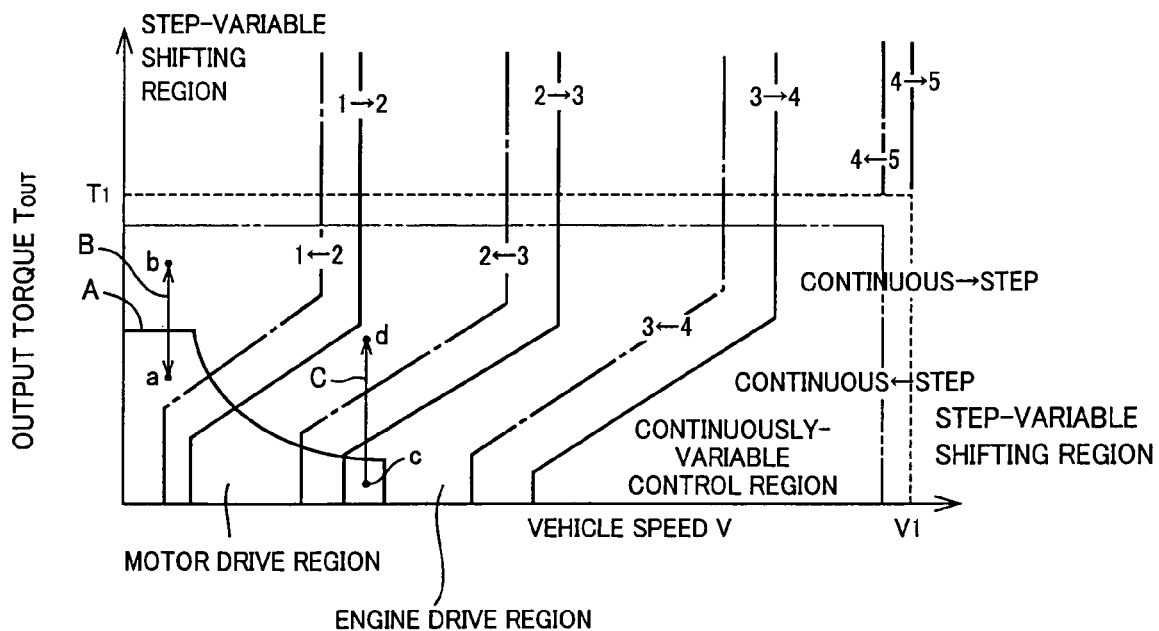
FIG. 6 is a view illustrating an example of a stored shifting boundary line map used for determining a shifting action of an automatic transmission portion, an example of a stored switching boundary line map used for switching the shifting state of a transmission mechanism of the drive system, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 6 represents an example of a boundary line defining an engine-drive region and a motor-drive region, for switching the vehicle drive power source for starting and driving the vehicle, between the engine 8 and the second electric motor M2. In other words, the vehicle drive mode is switchable between an "engine drive mode" corresponding to the engine-drive region in which the vehicle is started and driven with the engine 8 used as the vehicle drive power source, and the "motor drive mode" corresponding to the motor-drive region in which the vehicle is driven with the second electric motor M2 used as the vehicle drive power source. A predetermined stored relationship representing the boundary line (solid line A) of FIG. 6 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory 56, together with the shifting boundary line map (shifting map) indicated by solid lines and one-dot chain lines in FIG. 6.

The hybrid control portion 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 6. As is understood from FIG. 6, the motor drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control portion 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control portion 52 is further arranged to switch the engine 8 between its operated state and non-operated states, for switching the vehicle drive mode between the engine drive mode and the motor drive mode. To this end, the hybrid control portion 52 includes an engine start/stop control portion 66. This engine start/stop control portion 66 is configured to start or stop the engine 8, according to one of the motor drive mode and the engine drive mode which is selected by the hybrid control portion 52 on the basis of the vehicle condition and according to the drive-power-source switching boundary line map indicated in FIG. 6 by way of example.

For instance, the engine start/stop control portion 66 energizes the first electric motor M1 to raise the first electric motor speed $N_{M1}$, that is, operates the first electric motor M1 to function as an engine starter to raise the engine speed $N_E$ to a suitable value $N_E'$ at which the engine 8 can be started by ignition by the ignition device 99, when the vehicle condition is changed from a point "a" to a point "b" as indicated by solid line in FIG. 6, namely, from the motor drive region to the engine drive region, as a result of an increase of the required output torque $T_{OUT}$ by depression of the accelerator pedal. Thus, the vehicle drive mode is changed from the motor drive mode to the engine drive mode. In this case, the engine start/stop control portion 66 may rapidly raise the first electric motor speed $N_{M1}$ to rapidly raise the engine speed $N_E$ to the suitable value $N_E'$, for preventing resonance vibration of the engine 8 which would take place upon its starting at a speed lower than an idling speed $N_{EID}$, as well known in the art.

When the vehicle condition is changed from the point "b" to the point "a" as indicated by the solid line in FIG. 6, namely, from the engine drive region to the motor drive region, as a result of a decrease of the required output torque $T_{OUT}$ by releasing of the accelerator pedal, on the other hand, the engine start/stop control portion 66 commands the fuel injecting device 98 to stop a supply of the fuel to the engine 8, that is, to implement a fuel cut of the engine 8, so that the vehicle drive mode is changed from the engine drive mode to the motor drive mode. In this case, the engine start/stop control portion 66 may rapidly lower the first electric motor speed $N_{M1}$ to rapidly lower the engine speed $N_E$ to zero or substantially zero, for preventing the above-indicated resonance vibration. Alternatively, the engine start/stop control portion 66 may lowers the first electric motor speed $N_{M1}$ to lower the engine speed $N_E$ prior to the fuel cut of the engine 8, such that the fuel cut is implemented at the predetermined engine speed $N_E'$, to stop the engine 8.

The hybrid control portion 52 is further capable of performing a so-called "drive-force assisting" operation (torque assisting operation) to assist the engine 8, by supplying the second electric motor M2 with an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion 52 is further arranged to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control portion 52 is arranged to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

The high-speed-gear determining portion 62 is arranged to determine whether the gear position to which the transmission mechanism 10 should be shifted on the basis of the vehicle condition and according to the shifting boundary line map stored in the memory 56 and indicated in FIG. 6 by way of example is a high-speed-gear position, for example, the fifth gear position. This determination is made by determining whether the gear position selected by the step-variable shifting control portion 54 is the fifth gear position or not, for determining which one of the switching clutch C0 and brake B0 should be engaged to place the transmission mechanism 10 in the step-variable shifting state.

The switching control portion 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control portion 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control portion 50 places the transmission mechanism 10 in the continuously-variable shifting state or step-variable shifting state, depending upon whether the vehicle condition is in the continuously-variable shifting region or in the step-variable shifting region. Thus, the switching control portion 50 limits the electrically controlled differential function of the differential portion 11 by placing the differential portion 11 in the step-variable shifting state by controlling the switching clutch C0 and/or the switching brake B0.

Described in detail, when the switching control portion 50 determines that the vehicle condition is in the step-variable shifting region, the switching control portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining portion 62 has determined that the transmission mechanism 10 should be shifted to the fifth gear position, the switching control portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining portion 62 has not determined that the transmission mechanism 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0.

Thus, when the transmission mechanism 10 is switched to the step-variable shifting state by the switching control portion 50, the differential portion 11 operable as the auxiliary transmission is placed in a selected one of two gear positions under the control of the switching control portion 50 while the automatic transmission portion 20 connected in series to the differential portion 11 functions as a step-variable transmission, so that the transmission mechanism 10 as a whole functions as the so-called step-variable automatic transmission.

When the switching control portion 50 has determined that the vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the differential portion 11 in the continuously-variable shifting state. At the same time, the switching control portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control portion 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control portion 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control portion 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control portion 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
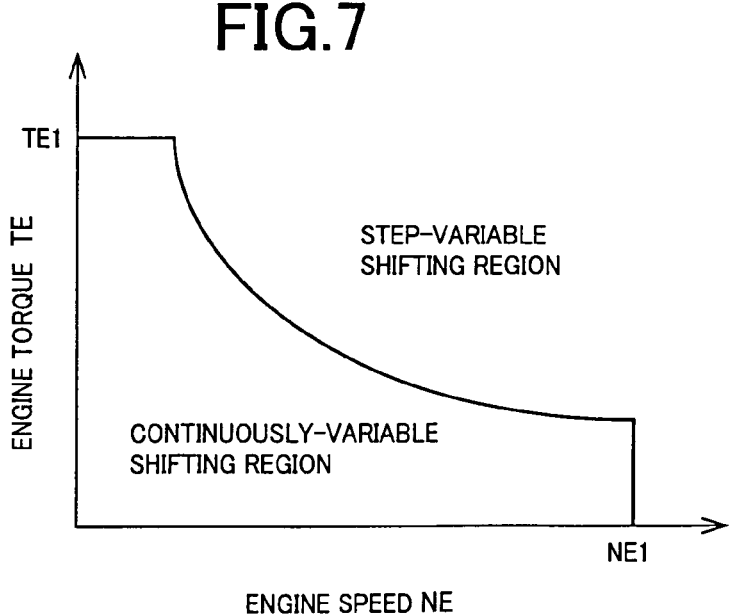
FIG. 7 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 7, there is shown a switching boundary line map (switching control map or relation) which is stored in the memory 56 and which defines engine-output lines serving as boundary lines used by the switching control portion 50 to determine whether the vehicle condition is in the step-variable or continuously-variable shifting region. These engine-output lines are defined by control parameters in the form of the engine speed $N_E$ and the engine torque $N_T$. The switching control portion 50 may use the switching boundary line map of FIG. 7 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 7. In other words, the broken lines in FIG. 6 may be determined on the basis of the relation (map) of FIG. 7, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 7 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 7 may be considered as high-speed threshold lines or high-engine-output threshold lines, which define upper limit of the vehicle speed V or engine output.

Figure 8:
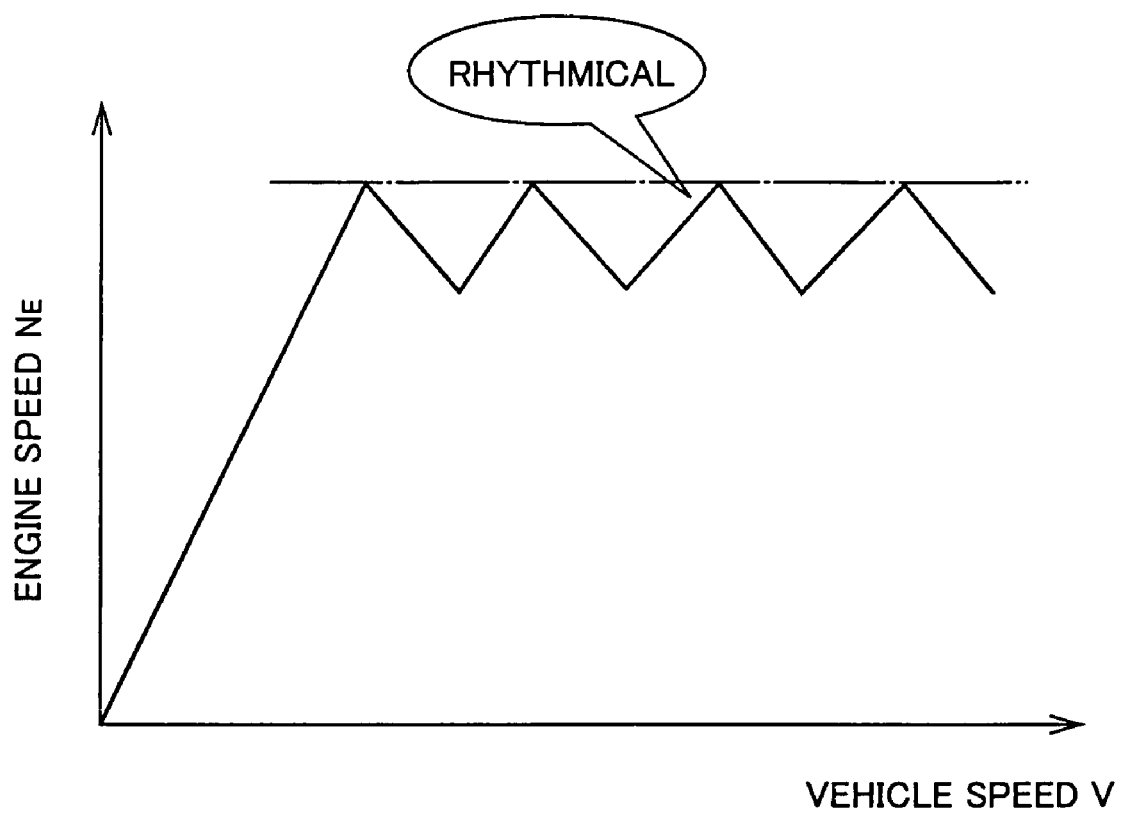
FIG. 8 is a view indicating an example of a change of the engine speed as a result of a shift-up action of the automatic transmission portion.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 8.

Thus, the differential portion 11 (transmission mechanism 10) is selectively switchable between the continuously-variable shifting state and the step-variable shifting state (fixed-speed ratio shifting state), by the switching control portion 50 on the basis of the vehicle condition. In the present embodiment, the hybrid control portion 52 selects one of the motor drive mode and the engine drive mode on the basis of the vehicle condition, and the engine start/stop control portion 66 selectively start or stop the engine 8 according to the selected vehicle drive mode.

A starting operation of the engine 8 under the control of the engine start/stop control portion 66 and a shifting action of the automatic transmission portion 20 under the control of the step-variable shifting control portion 54 may overlap each other, depending upon the specific vehicle condition. When the vehicle condition is changed from a point "c" to a point "d" as indicated by solid line C in FIG. 6, that is, from the motor drive mode to the engine drive mode, as a result of an increase of the required output toque $T_{OUT}$ by an operation of the accelerator pedal, for example, a shifting action of the automatic transmission portion 20 may take place concurrently. In this event, a starting shock of the engine 8 and a shifting shock of the automatic transmission portion 20 may overlap each other, so that the vehicle operator and passengers may feel a relatively large degree of shock upon concurrent occurrence of the change of the vehicle drive mode and the shifting action.

To reduce the shock as felt by the vehicle occupants due to overlapping of the starting operation of the engine 8 under the control of the engine start/stop control portion 66 and the shifting action of the automatic transmission portion 20 under the control of the step-variable shifting control portion 54, the control apparatus in the form of the electronic control device 40 includes the above-indicated vehicle-condition determining portion 80, engine-speed-rise control portion 82, overlap determining portion 84 and overlap control portion 86, which will be described in detail.

Referring back to FIG. 5, the vehicle-condition determining portion 80 is configured to determine (a) whether the presently selected shift position $P_{SH}$ of the shift lever detected by the shift position sensor 44 is a drive position or not, and (b) whether the motor drive mode is presently selected by the hybrid control portion 52. If these two determinations are affirmative, that is, if the above-indicated two conditions are satisfied, an affirmative determination is obtained by the vehicle-condition determining portion 80. If one of the two determinations is negative, that is, if one of the two conditions is not satisfied, a negative determination is obtained by the vehicle-condition determining portion 80. In this respect, it is noted that the shifting shock of the automatic transmission portion 20 and the starting shock of the engine 8 do not overlap each other.

The engine-speed-rise control portion 82 is operated when the affirmative determination is obtained by the vehicle-condition determining portion 80, and when a shifting command to shift the automatic transmission portion 20 is generated by the step-variable shifting control portion 54. The engine-speed-rise control portion 82 is configured to implement an engine-speed rise control for raising the engine speed $N_E$ to a value not lower than a predetermined engine starting speed $N_{EST}$ at which the engine 8 can be started. In this case, the engine-speed-rise control portion 82 selects, on the basis of the second electric motor speed $N_{M2}$, one of first, second and third methods of raising the engine speed $N_E$ to the predetermined engine starting speed $N_{EST}$ or higher. According to the first method, the first electric motor M1 is held in the de-energized state, and the switching brake B0 is engaged while the switching clutch C0 is held in the released state. According to the second method, the first electric motor M1 is held in the de-energized state, and the switching clutch C0 is engaged while the switching brake B0 is held in the released state. According to the third method, the first electric motor M1 is energized to raise the first electric motor speed $N_{M1}$ while the switching clutch C0 and switching brake B0 are both held in the released state. It is noted that the first and second methods according to which the first electric motor M1 is held in the de-energized state permit easier starting of the engine 8 than the third method. The engine-speed-rise control portion 82 cancels the engine-speed rise control if an engine starting command to start the engine 8 is not generated from the engine start/stop control portion 66 during a period from the moment of generation of the shifting command and the moment of completion of the shifting action of the automatic transmission portion 20. The engine-speed rise control implemented by the engine-speed-rise control portion 82 is an operation to control the rise of the engine speed $N_E$.

Figure 9:
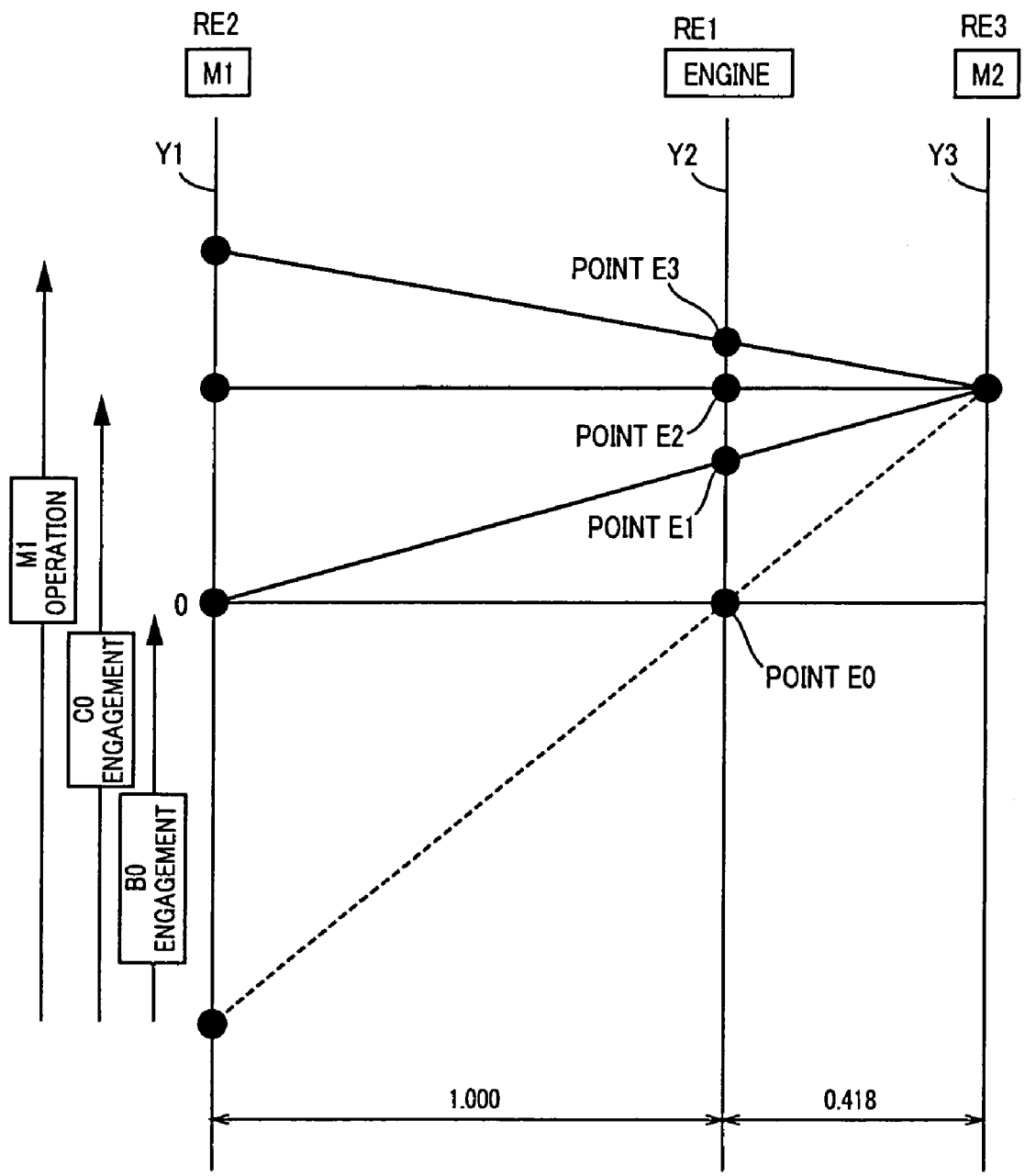
FIG. 9 is a collinear chart corresponding to a left portion of the collinear chart of FIG. 3 including vertical lines Y1-Y3, the collinear chart of FIG. 9 indicating relative rotating speeds of rotary elements of a differential portion when the engine is driven upon switching of the vehicle drive mode from the motor drive mode to the engine drive mode.

The collinear chart of FIG. 9 indicates relative rotating speeds of the rotary elements RE1, RE2 and RE3 of the differential portion 11 when the engine 8 is started by the three methods described above. The vertical lines Y1, Y2 and Y3 are identical with those in the collinear chart of FIG. 3. The first method is selected when the second electric motor speed $N_{M2}$ is equal to or higher than a predetermined reference value, for example, 1500 rpm. In this first method, the engine speed $N_E$ is raised from zero (represented by a point E0 at which the engine 8 is at rest) to a value (represented by a point E1) which is established by an engaging action of the switching brake B0 and to which the second electric motor speed $N_{M2}$ is lowered at a predetermined speed ratio. The above-indicated reference value is determined such that the engine speed $N_E$ represented by the point E1 is not lower than the starting speed $N_{EST}$ indicated above, for example, 400 rpm. These reference value and starting speed $N_{EST}$ are stored in the engine-speed rise control portion 82.

The second method is selected when the second electric motor speed $N_{M2}$ is lower than the predetermined reference value and is higher than the engine starting speed $N_{EST}$. In the second method, the engine speed $N_E$ is raised from zero (represented by the point E0 at which the engine 8 is at rest) to a value (represented by a point E2) which is established by an engaging action of the switching brake B0 and which is equal to the second electric motor speed $N_{M2}$, in this embodiment.

The third method is selected when the second electric motor speed $N_{M2}$ is lower than the engine starting speed $N_{EST}$. In the third method, the engine speed $N_E$ is raised from zero (represented by the point E0 at which the engine 8 is at rest) to the engine starting speed $N_{EST}$ (represented by a point E3; e.g., 400 rpm), by energization of the second electric motor speed $N_{M2}$ to raise its speed $N_{M2}$.

The overlap determining portion 84 stores therein required shifting times of the different shifting actions of the automatic transmission portion 20. The required shifting time of each shifting action is a length of time from the moments of initiation and completion of the shifting action. When the engine starting command to start the engine 8 is generated from the engine start/stop control portion 66, the overlap determining portion 84 specifies the shifting action on the basis of the gear positions of the automatic transmission portion 20 before and after the shifting action, which gear positions are represented by information received from the step-variable shifting control portion 54. Then, the overlap determining portion 48 estimates the moment of completion of the shifting action in question, on the basis of the stored required shifting times. On the basis of engine speed $N_E$ detected by the engine speed sensor 46, the overlap determining portion 84 further determines whether the operation to start the engine 8 can be initiated immediately. On the basis of the estimated moment of completion of the shifting action and a result of determination as to whether the engine starting operation can be initiated immediately, the overlap determining portion 84 determines whether the shifting action (a terminal portion of the shifting action) and the starting (ignition) of the engine 8 overlap each other or not. This determination is made by determining whether an estimated time difference between the moment of completion of the shifting action and the moment of initiation of the engine starting operation is shorter than a predetermined lower limit, which is obtained by experimentation and above which a shock as felt by the vehicle occupants upon concurrent shifting of the automatic transmission portion 20 and starting of the engine 8 can be relatively small. The overlap determining portion 84 determines that the terminal portion of the shifting action and the engine starting overlap each other when the above-indicated time difference is shorter than the lower limit stored in the overlap determining portion 84.

If the overlap determining portion 84 determines that the terminal portion of the shifting action of the automatic transmission portion 20 and the starting of the engine 8 overlap each other, the overlap control portion 86 operates to retard or delay the moment of starting (ignition) of the engine 8, and initiates a fuel supply to the engine 8 a predetermined time prior to the delayed moment of ignition of the engine 8, so that the engine 8 is started (ignited) after the moment of completion of the shifting action, namely, after the above-indicated time difference has passed, but at a moment as early as possible. If the overlap determining portion 84 determines that the terminal portion of the shifting action and the engine starting do not overlap each other, the overlap control portion 86 initiates the fuel supply to the engine 8 a predetermined time prior to the estimated moment of ignition of the engine 8, to start the engine 8 prior to the moment of completion of the shifting action, without retarding the moment of ignition of the engine 8. In this case, the overlap control portion 86 informs the torque reduction control portion 90 that the engine 8 has been started prior to the moment of completion of the shifting action.

When the starting of the engine 8 is delayed under the control of the overlap control portion 86 in the event of the affirmative determination by the overlap determining portion 84 that the shifting action and the starting of the engine 8 overlap each other, a rise of the engine torque $T_E$ is delayed due to the delayed starting of the engine 8. In this event, the torque assisting portion 88 commands the hybrid control portion 52 to implement a temporary torque assisting operation to assist the engine 8, by operating the second electric motor M2, for compensation for the delayed rise of the engine torque $T_E$.

When the vehicle drive mode is switched from the motor drive mode to the engine drive mode as a result of an operation of the accelerator pedal by the vehicle operator who desires a rapid increase of the vehicle drive torque and higher acceleration of the vehicle, the delayed rise of the engine torque $T_E$ should be compensated for by the temporary torque assisting operation implemented by the hybrid control portion 52 under the control of the torque assisting portion 88.

When the torque reduction control portion 90 is informed by the overlap control portion 86 that the engine 8 has been started prior to the moment of completion of the shifting action of the automatic transmission portion 20, the torque reduction control portion 90 implements a temporary torque reduction control to reduce the engine torque $T_E$ upon completion of the shifting action for reducing a shifting shock of the automatic transmission portion 20, where the shifting action is a shift-down action. Where the second electric motor M2 is operating during the shift-down action, the torque reduction control portion 90 may temporarily reduce the output torque of the second electric motor M2, rather than the engine torque $T_E$.

Figure 10:
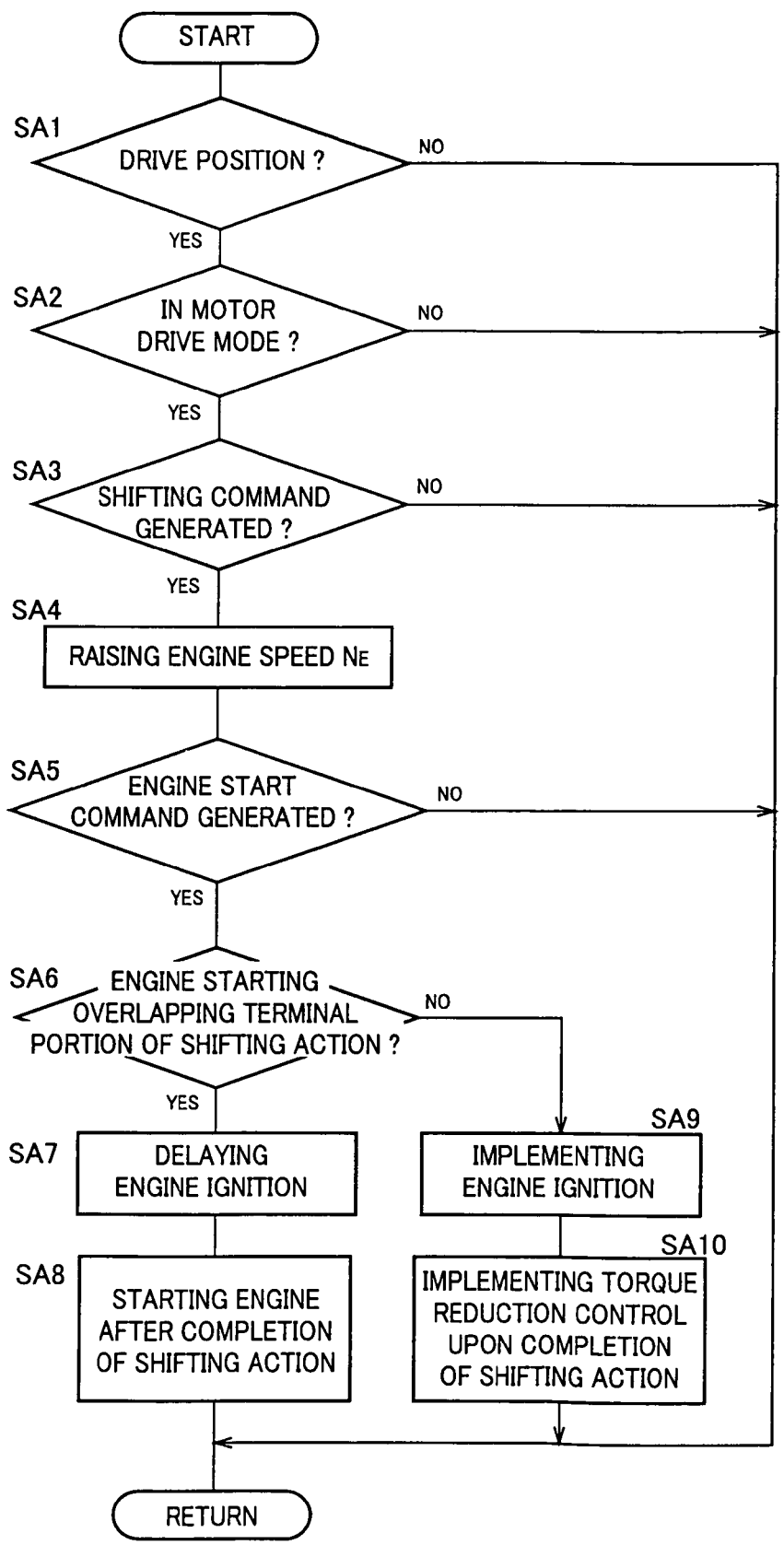
FIG. 10 is a flow chart illustrating a control routine executed by the electronic control device of FIG. 5, that is, a control operation performed when a terminal portion of a shifting action of the automatic transmission portion and a starting operation of the engine overlap each other.

FIG. 10 is a flow chart illustrating a major portion of a control operation of the electronic control device 40, that is, a control routine executed when the commands to shift the automatic transmission portion 20 and to start the engine 8 are generated. This control routine is repeatedly executed with an extremely short cycle time of about several milliseconds to about several tens of milliseconds, for example.

The control routine of FIG. 10 is initiated with step SA1 to determine whether the presently selected shift position $P_{SH}$ of the shift lever detected by the shift position sensor 44 is the drive position D. If a negative determination is obtained in step SA1, one cycle of execution of the present control routine is terminated. If an affirmative determination is obtained in step SA1, the control flow goes to step SA2 to determine whether the motor drive mode is presently established (selected). If a negative determination is obtained in step SA2, one cycle of execution of the present control routine is terminated. If an affirmative determination is obtained in step SA2, the control flow goes to step SA3.

Step SA3 is provided to determine whether a command to shift the automatic transmission portion 20 has been generated. If a negative determination is obtained in step SA3, one cycle of execution of the present control routine is terminated. If an affirmative determination is obtained in step SA3, the control flow goes to step SA4. It will be understood that steps SA1-SA3 correspond to the vehicle-condition determining portion 80 described above.

In step SA4, the engine speed $N_E$ is raised to the engine starting speed $N_{EST}$ at which the engine 8 can be started. This engine speed-rise control by the engine-speed rise control portion 82 is implemented by one of the three methods. Namely, when the second electric motor speed $N_{M2}$ is equal to or higher than the predetermined reference value, the first electric motor M1 is held in the de-energized state, and the switching brake B0 is engaged while the switching clutch C0 is held in the released state. When the second electric motor speed $N_{M2}$ is lower than the predetermined reference value and is higher than the engine starting speed $N_{EST}$, the first electric motor M1 is held in the de-energized state, and the switching clutch C0 is engaged while the switching brake B0 is held in the released state. When the second electric motor speed $N_{M2}$ is lower than the engine starting speed $N_{EST}$, the first electric motor M1 is energized to raise the first electric motor speed $N_{M1}$ while the switching clutch C0 and switching brake B0 are both held in the released state. It will be understood that steps SA3 and SA4 correspond to the engine-speed-rise control portion 82.

Step SA4 is followed by step SA5 to determine whether the command to start the engine 8 has been generated. If a negative determination is obtained in step SA5, one cycle of execution of the present control routine is terminated. If an affirmative determination is obtained in step SA5, the control flow goes to step A6.

In step SA6, the commanded shifting action is specified on the basis of the gear positions of the automatic transmission portion 20 before and after the shifting action, and the moment of completion of the shifting action in question is estimated on the basis of the stored required shifting times. On the basis of engine speed $N_E$ detected by the engine speed sensor 46, the determination is made as to whether the operation to start the engine 8 can be initiated immediately. On the basis of the estimated moment of completion of the shifting action and a result of the determination as to whether the engine starting operation can be initiated immediately, the determination is made as to whether the shifting action and the starting (ignition) of the engine 8 overlap each other or not. If a negative determination is obtained in step SA6, the control flow goes to step SA9. If an affirmative determination is obtained in step SA6, the control flow goes to step SA7. It is determined that the shifting action and the engine starting overlap each other, if the estimated time difference between the moment of completion of the shifting action and the moment of initiation of the engine ignition is shorter than the predetermined lower limit. It will be understood that steps SA5 and SA6 correspond to the overlap determining portion 84.

In step SA7, the moment of ignition of the starting (ignition) of the engine 8 is retarded, and the fuel supply to the engine 8 is initiated the predetermined time prior to the delayed moment of ignition of the engine 8, so that the engine 8 is started (ignited) after the moment of completion of the shifting action, namely, after the above-indicated time difference has passed, but at a moment as early as possible.

In step SA9, the fuel supply to the engine 8 is initiated a predetermined time prior to the estimated moment of ignition of the engine 8, so that the engine 8 is started (ignited) without retarding the moment of ignition, prior to the moment of completion of the shifting action. It will be understood that step SA7 corresponds to the overlap control portion 86 while step SA8 corresponds to the torque assisting portion 88. It will also be understood that the overlap determining portion 84 and the overlap control portion 86 cooperate to function as a control portion which is operable when the terminal portion of a shifting action of the automatic transmission portion 20 and a starting operation of the engine 8 overlap each other and which is configured to implement one of the shifting action and the engine starting operation prior to the other.

Step SA9 is followed by step SA10 corresponding to the torque reduction control portion 90, in which the temporary torque reduction control is implemented to reduce the output torque $T_E$ of the engine 8 already started in step SA9 prior to the moment of completion of the shifting action, for reducing the shifting shock upon completion of the shifting action, where the shifting action is a shift-down action.

Figure 11:
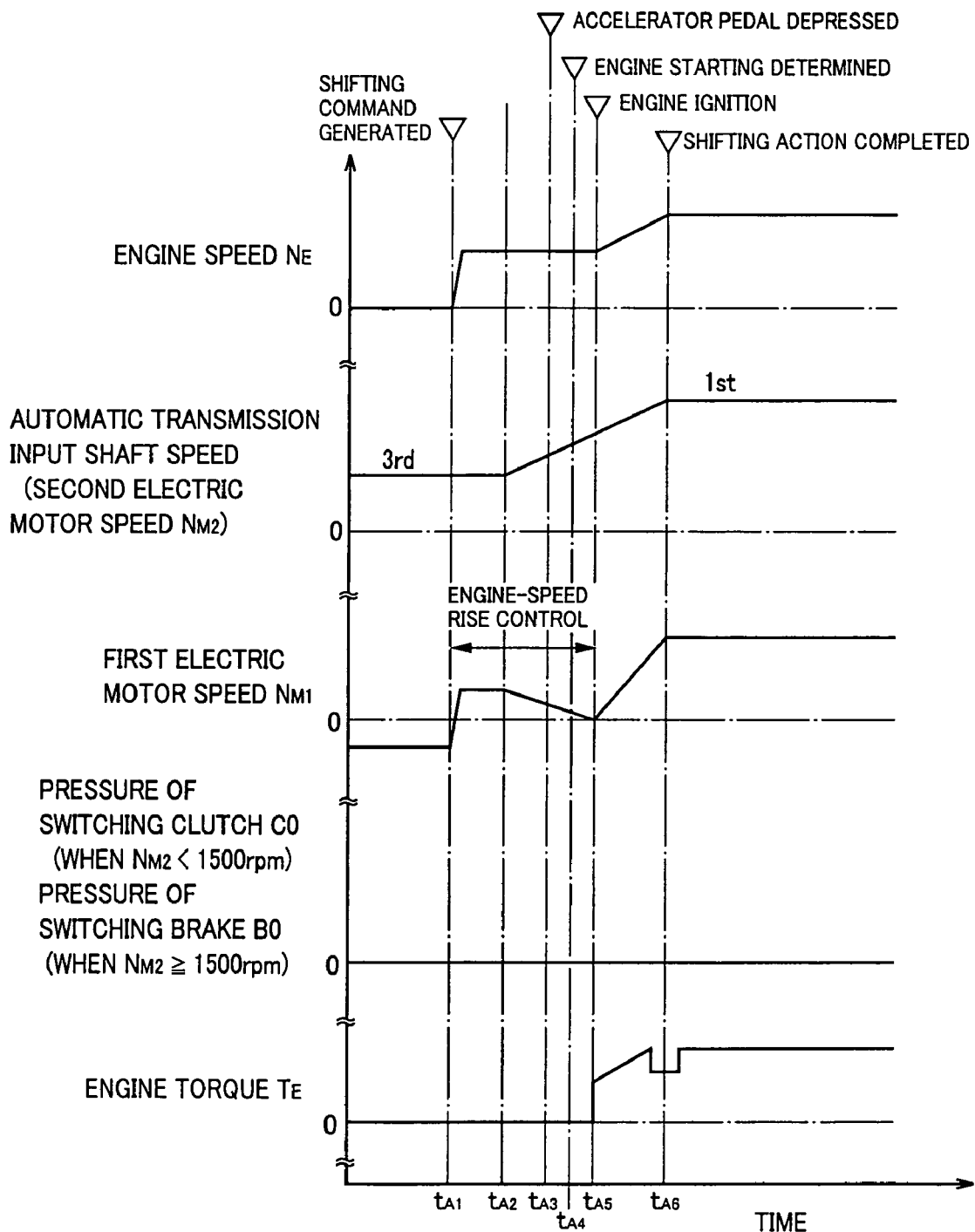
FIG. 11 is a time chart for explaining the control operation illustrated in the flow chart of FIG. 10, when a negative determination is obtained in step SA6 of FIG. 10 as a result of a shift-down action of the automatic transmission portion from a third gear position to a first gear position in the motor drive mode and a rise of the operating speed of the engine driven by a first electric motor.
Figure 12:
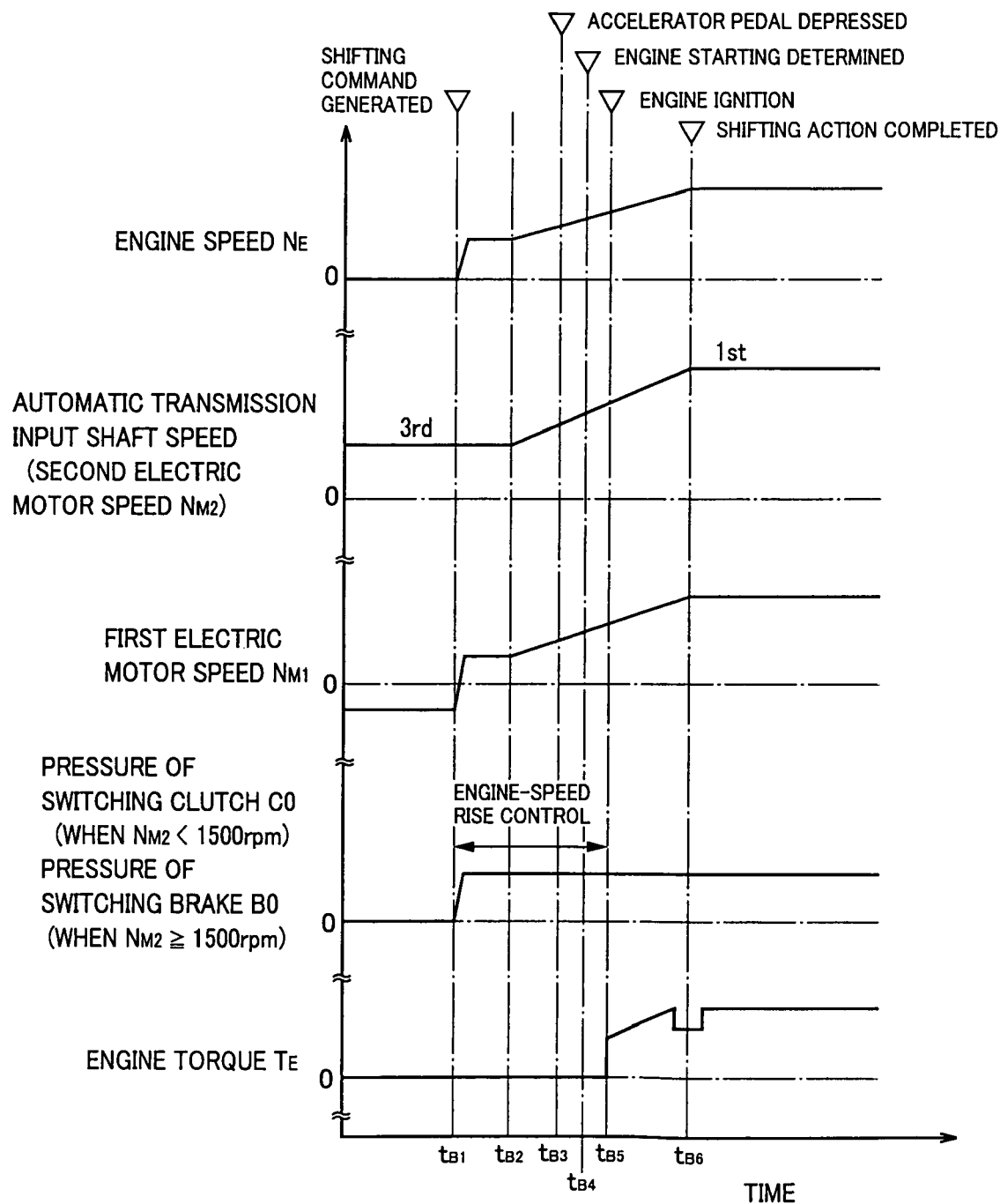
FIG. 12 is a time chart for explaining the control operation of the flow chart of FIG. 10, when a negative determination is obtained in step SA6 of FIG. 10 as a result of the shift-down action of the automatic transmission portion from the third gear position to the first gear position in the motor drive mode and a rise of the engine speed due to an engaging action of a switching clutch C0 of the differential portion.

FIGS. 11-13 are time charts for explaining the control operation when the control routine illustrated in the flow chart of FIG. 10 is executed when the automatic transmission portion 20 is commanded to be shifted down from the third gear position to the first gear position in the motor drive mode, with the shift lever placed in the drive position D. In the examples of FIGS. 11 and 12, the engine starting is not retarded. In the example of FIG. 13, the engine starting is retarded. As is apparent from FIG. 1, the input shaft speed of the automatic transmission portion 20 indicated in FIGS. 11-13 is the rotating speed of the power transmitting member 18, which is equal to the second electric motor speed $N_{M2}$. The second parameter as counted from the bottom of the time charts of FIGS. 11-13 is the hydraulic pressure of the switching brake B0 where the second electric motor speed $N_{M2}$ is equal to or higher than the predetermined reference value (e.g., 1500 rpm), or the hydraulic pressure of the switching clutch C0 where the second electric motor speed $N_{M2}$ is lower than the predetermined reference value.

At points of time $T_{A1}$, $T_{B1}$, $T_{C1}$ indicated in FIGS. 11-13, the shifting command to shift the automatic transmission portion 20 is generated, and therefore the affirmative determination is obtained in step SA3 of FIG. 10. During a time period from these points of time $T_{A1}$, $T_{B1}$, $T_{C1}$ to points of time $T_{A5}$, $T_{B5}$, $T_{C5}$, the engine-speed rise control is implemented. Described in detail, in the examples of FIGS. 11 and 13, the engine speed $N_E$ is raised according to the third method described above, that is, by energizing the first electric motor M1 to raise its speed $N_{M1}$ while the switching brake B0 and switching clutch C0 are held in the released state, without a rise of the hydraulic pressure applied thereto. In the example of FIG. 12, the engine speed $N_E$ is raised according to the second method described above, that is, by engaging the switching clutch C0 while the switching brake B0 is held in the released state and while the first electric motor M1 is held in the de-energized state. That is, the hydraulic pressure applied to the switching clutch C0 is raised at the point of time $T_{B1}$, and the first electric motor speed $N_{M1}$ is raised immediately after the point of time $T_{B1}$, as indicated in FIG. 12. As a result of initiation of the shifting action of the automatic transmission portion 20 according to the shifting command generated at the points of time $T_{A1}$, $T_{B1}$, $T_{C1}$, the input shaft speed of the automatic transmission portion 20 (second electric motor speed $N_{M2}$) is raised during a time period from points of time $T_{A2}$, $T_{B2}$, $T_{C2}$ to points of time $T_{A6}$, $T_{B6}$, $T_{C5}$ at which the shifting action is completed. In the examples of FIGS. 11 and 13, the first electric motor speed $N_{M1}$ is lowered during a time period beginning at the point of time $T_{A2}$, $T_{C2}$, for saving electric energy consumption by the first electric motor M1, because a further rise of the engine speed $N_E$ is not necessary owing to a rise of the input shaft speed of the automatic transmission portion 20. In the example of FIG. 12, the first electric motor speed $N_{M1}$ and the engine speed $N_E$ are raised during a time period beginning at the point of time $T_{B2}$, because the first electric motor speed $N_{M1}$ and the engine speed $N_E$ become equal to the input shaft speed of the automatic transmission portion 20, as a result of the engaging action of the switching clutch C0, and because the input shaft speed is raised.

At points of time $T_{A3}$, $T_{B3}$, $T_{C3}$ indicated in FIGS. 11-13, the engine starting command is generated as a result of an increase of the required output torque $T_{OUT}$ by depression of the accelerator pedal. At points of time $T_{A4}$, $T_{B4}$, $T_{C4}$, step SA6 is implemented to determine whether the terminal portion of the shifting action of the automatic transmission portion 20 and the starting or ignition of the engine 8 overlap each other, or not.

In the example of FIG. 13, the point of time $T_{C3}$ at which the engine starting command is generated is close to the estimated point of time $T_{C5}$ at which the shifting action is completed, so that the affirmative determination that the shifting action of the automatic transmission 20 and the starting of the engine 8 overlap each other is obtained in step SA6 of FIG. 10. In this case, the ignition of the engine 8 is retarded in the following step SA7, and in the following step SA8 the engine 8 is started (with the ignition being initiated) after the moment of completion of the shifting action, that is, after a point of time $T_{C6}$ subsequent to the point of time $T_{C5}$ at which the shifting action is completed. Accordingly, a rise of the engine torque $T_E$ is initiated at the point of time $T_{C6}$. In the example of FIG. 13, the point of time $T_{C3}$ at which the accelerator pedal is depressed is close to the estimated point of time $T_{C5}$ at which the shifting action is completed, and the torque assisting operation is performed, so that a delay of the rise of the engine torque $T_E$ due to a retarded moment of initiation of the engine starting to a moment after the point of time $T_{C5}$ will not be felt by the vehicle occupants.

In the examples of FIGS. 11 and 12, on the other hand, the point of time $T_{B3}$, $T_{C3}$ at which the engine starting command is generated is not close to the estimated point of time $T_{A6}$, $T_{B6}$ at which the shifting action is completed, so that the negative determination that the shifting action of the automatic transmission 20 and the starting of the engine 8 do not overlap each other is obtained in step SA6 of FIG. 10. In this case, the starting (ignition) of the engine 8 is implemented in step SA9, without retarding the moment of the engine starting, that is, at the point of time $T_{A5}$, $T_{B5}$ prior to the point of time $T_{A6}$, $T_{B6}$ at which the shifting action is completed, so that the rise of the engine torque $T_E$ is initiated at the point of time $T_{A5}$, $T_{B5}$. In these examples in which the above-indicated time difference between the moment of the engine starting and the estimated moment of completion of the shifting action is not shorter than the predetermined lower limit, namely, the time difference between the points of time $T_{A5}$, $T_{A6}$ in the example of FIG. 11, and the time difference between the points of time $T_{A5}$, $T_{A6}$ in the example of FIG. 12 are not shorter than the predetermined lower limit.

In the examples of FIGS. 11 and 12, the temporary torque reduction control is implemented to reduce the engine torque $T_E$ at the point of time $T_{A6}$, $T_{B6}$, that is, upon completion of the shifting action, so that the shifting shock upon completion of the shifting action is reduced.

In the example of FIG. 13, the rise of the engine torque TE is terminated at a point of time $T_{C7}$. During a time period from the point of time $T_{C5}$ (at which the shifting action is completed to the point of time $T_{C7}$, the torque assisting operation by the second electric motor M2 is implemented to assist the engine 8, for compensating the delayed rise of the engine torque $T_E$ after the moment of completion of the shifting action.

The hybrid vehicle control apparatus in the form of the electronic control device 40 constructed according to the present embodiment is arranged such that the overlap determining portion 84 determines whether a terminal portion of a shifting action of the automatic transmission portion 20 and a starting operation (initiation of ignition) of the engine 8 overlap each other, and such that when the affirmative determination is obtained by the overlap determining portion 84, the overlap control portion 86 retards the moment of starting (ignition of ignition) of the engine 8, so that the engine 8 is started (ignited) after the moment of completion of the shifting action of the automatic transmission portion 20, whereby it is possible to prevent overlapping of a starting shock of the engine 8 and a shifting shock of the automatic transmission portion 20, so that the vehicle operator would not feel a large degree of shock even if the engine starting command and the shifting command are generated at points of time that are relatively close to each other.

Where the terminal portion of the shifting action and the engine starting do not overlap each other, the engine 8 is started immediately after the moment of generation of the engine starting command, if the engine starting command is generated during the engine-speed-rise control after the moment of generation of the shifting command and before the moment of completion of the shifting action. Where the engine starting is retarded to a moment after the moment of completion of the shifting action, the engine 8 is started at a moment as early as possible after the moment of completion of the shifting action, so that the vehicle operator will not feel a delayed moment of completion of the shifting action and a delayed rise of the vehicle drive torque, with respect to the moments at which the completion of the shifting action and the vehicle drive torque rise are expected by the vehicle operator to take place.

The present embodiment is further configured such that upon generation of the command to shift the automatic transmission portion 20, the engine-speed rise control is implemented by the engine-speed-rise control portion 82 so that the engine 8 can be started immediately if the accelerator pedal is depressed during the shifting action, whereby the engine torque $T_E$ can be rapidly raised or increased, with a high response to an operation of the accelerator pedal by the vehicle operator.

When the engine 8 is started upon switching of the vehicle drive mode from the motor drive mode to the engine drive mode, the engine speed $N_E$ is raised according to the above-described first or second method of the engine-speed rise control, by engaging the switching brake B0 or switching clutch C0 while the first electric motor M1 is held in the de-energized state, where the second electric motor speed $N_{M2}$ is equal to or higher than the predetermined engine starting speed $N_{EST}$. Accordingly, the energy consumption of the first electric motor M1 can be saved. Where the second electric motor speed $N_{M2}$ is lower than the predetermined engine starting speed $N_{EST}$, the engine speed $N_E$ is raised according to the above-described third method, by energizing the first electric motor M1 to raise its speed $N_{M1}$, so that the engine speed $N_E$ can be raised to a desired value by raising the first electric motor speed $N_{M1}$, as is apparent from the collinear chart of FIG. 9. Accordingly, the second electric motor speed $N_{M2}$ lower than the speed corresponding to the predetermined engine starting speed $N_{EST}$ can be raised, and the raised second electric motor speed $N_{M2}$ is transmitted to the engine 8, so that the engine 8 can be started irrespective of the second electric motor speed $N_{M2}$.

In the first method of the engine-speed rise control which is selected when the second electric motor speed $N_{M2}$ is equal to or higher than the above-indicated predetermined reference value, and in which the first electric motor is not energized, the second electric motor speed $N_{M2}$ is lowered at the predetermined speed ratio, and the lowered second electric motor speed $N_{M2}$ is transmitted to the engine 8. Accordingly, the durability of the power distributing mechanism 16 can be improved.

Under some conditions, the engine 8 is started without a retard during a shifting action of the automatic transmission portion 20. In this case, the engine torque $T_E$ is rapidly increased in partially engaged state of the two frictional coupling devices selected from the clutches and brakes C1, C2, B1-B3 of the automatic transmission portion 20, which are eventually fully engaged to perform the relevant shifting action. Accordingly, the starting shock of the engine 8 is less likely to the transmitted to the drive wheels 38.

The present embodiment is further arranged such that where the engine is started prior to the moment of completion of a shift-down action of the automatic transmission portion 20, the engine torque $T_E$ is temporarily reduced to reduce the shifting shock which would take place upon completion of the shift-down action.

The present embodiment is further arranged such that where the engine starting is retarded, the torque assisting operation to assist the engine 8 is performed to compensate for a delayed rise of the engine torque $T_E$, so that the vehicle occupants would not feel a delayed rise of the engine torque $T_E$.

While the preferred embodiment of this invention has been described in detail by reference to the accompanying drawings, for illustrative purpose only, it is to be understood that the present invention may be embodied with various changes and modifications which may occur to those skilled in the art.

For example, the overlap control portion 86 may be modified to recognize the completion of a shifting action of the automatic transmission portion 20, according to information received from the step-variable shifting control portion 54, which indicates the completion of the shifting action, or on the basis of a signal received from a hydraulic sensor incorporated in the automatic transmission portion 20.

In the illustrated embodiment, the engine-speed-rise control portion 82 is configured to receive a shifting command generated from the step-variable shifting control portion 54 to perform a shifting action of the automatic transmission portion 20, to recognize the generation of the shifting command. However, the engine-speed-rise control portion 82 may be configured to recognize the generation of the shifting command on the basis of a signal received from the above-indicated hydraulic sensor incorporated in the automatic transmission portion 20.

The overlap determining portion 84 may be configured to make the determination as to whether the terminal portion of the shifting action of the automatic transmission portion 20 overlaps the starting of the engine, 8, by taking account of a moment of the engine starting which varies depending upon a specific kind of a fuel used for the engine 8.

In the illustrated embodiment, the engine speed $N_E$ is raised for starting the engine 8 upon switching of the vehicle drive mode from the motor drive mode to the engine drive mode. However, this rise of the engine speed $N_E$ need not be implemented for the sole purpose of starting the engine 8, but may be implemented by utilizing any other control which involves a rise of the engine speed $N_E$.

In the illustrated transmission mechanism 10, the differential portion 11 (power distributing mechanism 16) functions as the electrically controlled continuously-variable transmission the speed ratio γ0 of which is continuously variable from the minimum value of γ0min to the maximum value of γ0max. However, the speed ratio γ0 of the differential portion 11 may be variable in steps, by utilizing its differential function.

While the engine 8 and the differential portion 11 are connected directly to each other in the illustrated transmission mechanism 10, the engine 8 and the differential portion 11 may be connected to each other through a clutch or any other coupling device.

In the illustrated transmission mechanism 10, the first electric motor M1 and the second rotary element RE2 are connected directly to each other while the second electric motor M2 and the third rotary element RE3 are connected directly to each other. However, the first electric motor M1 and the second rotary element RE2 may be connected to each other through a clutch or any other coupling device, and the second electric motor M2 and the third rotary element RE3 may be connected to each other through a clutch or any other coupling device.

In the illustrated transmission mechanism 10, the automatic transmission portion 20 is disposed between the differential portion 11 and the drive wheels 38, the automatic transmission portion 20 may be disposed between the engine 8 and the differential portion 11. The automatic transmission portion 20 is required to constitute a part of the power transmitting path between the engine and the drive wheels 38.

In the illustrated transmission mechanism 10 shown in FIG. 1, the differential portion 11 and the automatic transmission portion 20 are connected in series with each other. However, the present invention is applicable to a vehicular drive system in which the differential portion 11 and the automatic transmission portion 20 are not mechanically independent of each other, provided the transmission mechanism 10 as a whole has an electrically controlled differential function, and a function of changing its overall speed ratio in a manner other than the electrically controlled differential function.

While the power distributing mechanism 16 in the illustrated transmission mechanism 10 is constituted by the single-pinion type planetary gear set 24, the power distributing mechanism 16 may be constituted by a double-pinion type planetary gear set.

In the illustrated transmission mechanism 10, the engine 8 is operatively connected to the first rotary element RE1 of the planetary gear set 24 of the differential portion 11, and the first electric motor M1 is operatively connected to the second rotary element RE2, while the drive wheels 38 are operatively connected to the third rotary element RE3. However, the engine 8, first electric motor M1 and drive wheels 38 may be operatively connected to selected ones of rotary elements of two planetary gear sets that are connected to each other, so that the differential portion 11 is switched between its step-variable and continuously-variable shifting states by selectively engaging switching clutch and brake connected to selected one of the rotary elements.

The automatic transmission portion 20 functioning as an automatic transmission may be replaced by a transmission portion functioning as a manual transmission.

In the illustrated transmission mechanism 10, the second electric motor M2 is connected to the power transmitting member 18 which constitutes a part of the power transmitting path between the engine 8 and the drive wheels 38. The transmission mechanism 10 may be modified such that the second electric motor M2 connected to the power transmitting path is connectable to the power distributing mechanism 16 through a clutch or any other coupling device, so that the differential state of the power distributing mechanism 16 is controllable by controlling the second electric motor M2 rather than the first electric motor M1.

What is claimed is:

1. A control apparatus for a drive system of a hybrid vehicle including (a) an engine, (b) an electrically controlled differential portion which has a first electric motor, and a differential mechanism operatively connected to the engine and the first electric motor and a differential state of which is controlled by controlling an operating state of the first electric motor, (c) a mechanical transmission portion constituting a part of a power transmitting path, and (d) a second electric motor connected to the power transmitting path between the electrically controlled differential portion and a drive wheel of the hybrid vehicle, said control apparatus comprising:

a control portion being configured to implement an engine-speed rise for raising an operating speed of the engine with a shifting action of said mechanical transmission portion before an initiation of ignition of the engine; and said control portion operable when a terminal portion of said shifting action of said mechanical transmission portion and said initiation of ignition of said engine overlap each other, said control portion being configured to implement one of said shifting action and said initiation of ignition prior to the other.

2. The control apparatus according to claim 1, wherein the control portion further comprises an engine-speed-rise control portion configured to implement an engine-speed rise control for raising the operating speed of the engine to a value not lower than a predetermined engine starting speed at which the engine can be ignited, when a command to perform said shifting action of the mechanical transmission portion is generated.

3. The control apparatus according to claim 2, wherein said engine-speed-rise control portion is configured to implement one of (i) an operation to raise an operating speed of said second electric motor and transmit the raised operating speed of the second electric motor to said engine, according to an operating speed of said first electric motor, and (ii) an operation to transmit the operating speed of the second electric motor to the engine at a predetermined speed ratio, and wherein said engine-speed-rise control portion determines, on the basis of the operating speed of the second electric motor, the operating speed of the first electric motor or de-energization of the first electric motor.

* * * * *